Nov. 21, 1939.　　　　　R. F. PEO　　　　2,180,943
AIR CONDITIONING SYSTEM FOR AUTOMOBILES
Filed Nov. 13, 1935　　　2 Sheets-Sheet 1
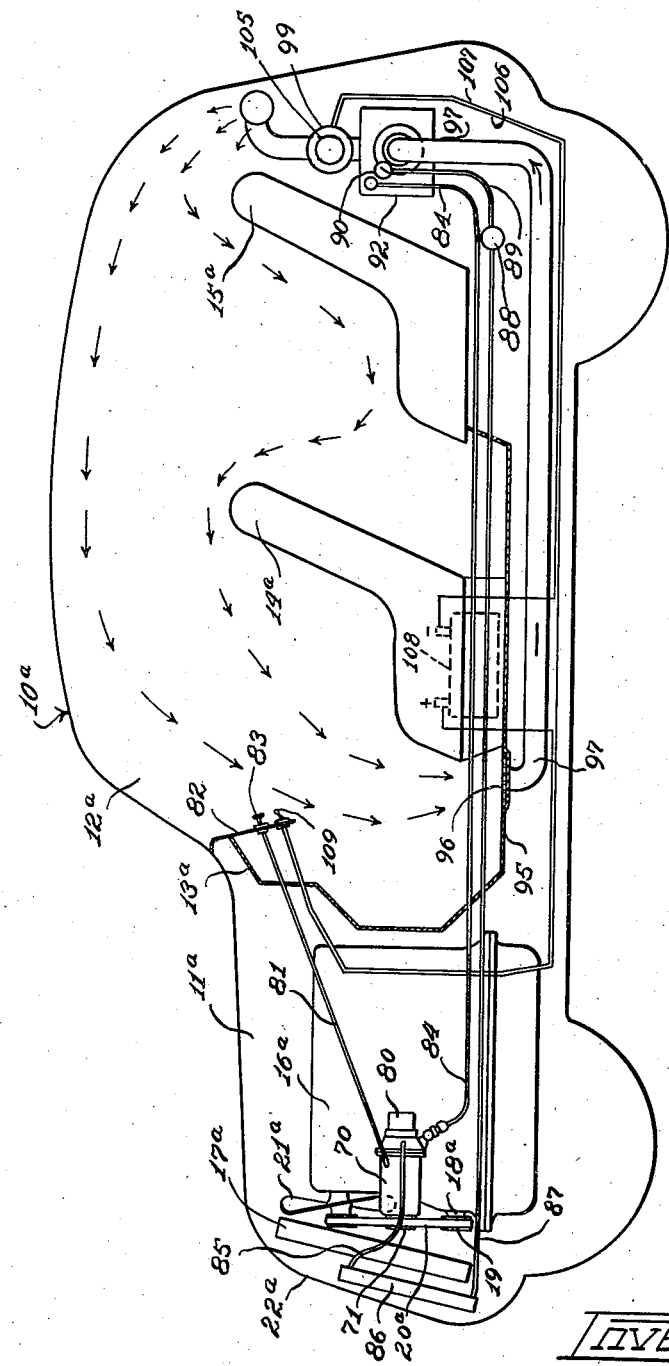
Inventor
Ralph F. Peo
By Charles H. Niell Attys

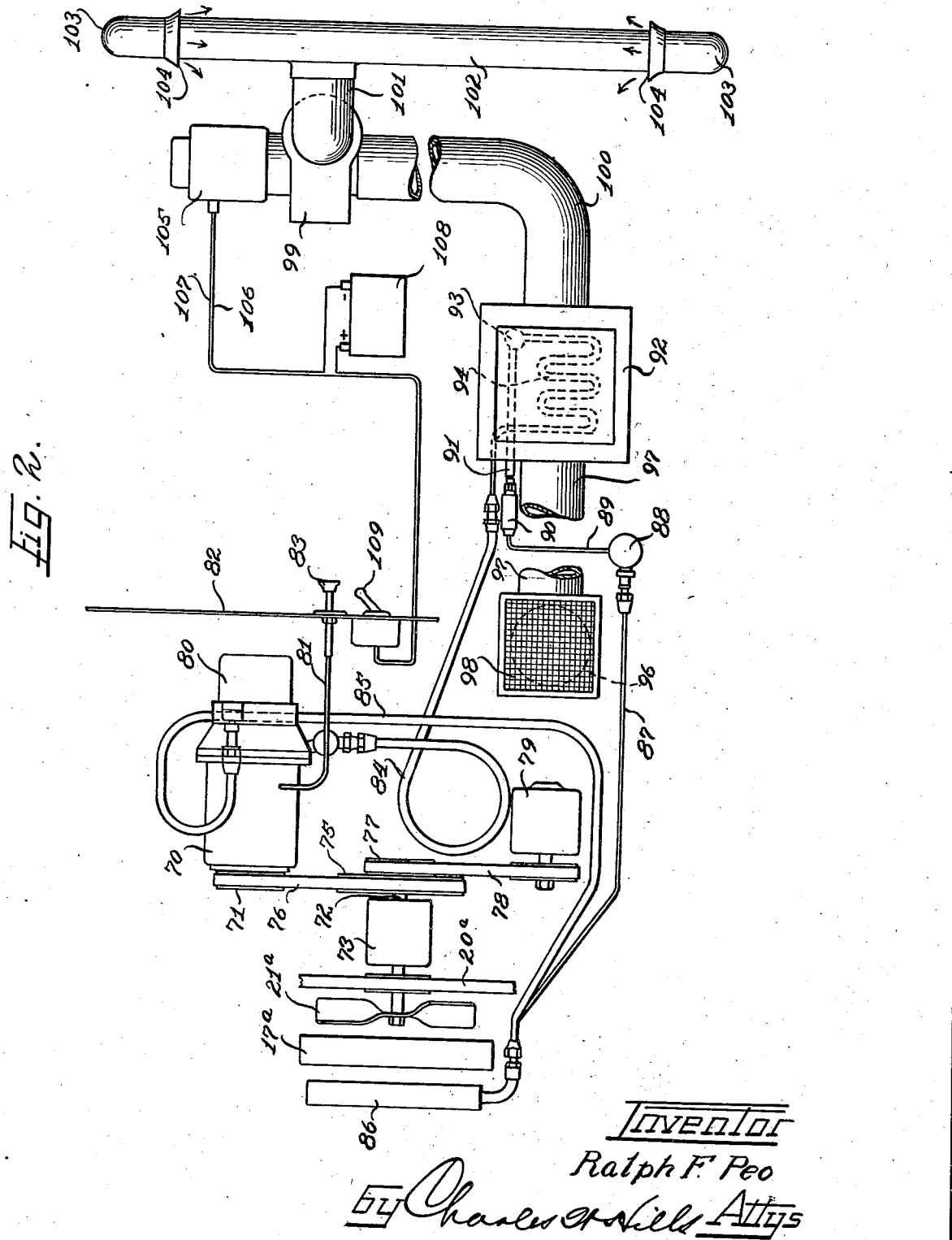

Patented Nov. 21, 1939

2,180,943

UNITED STATES PATENT OFFICE 2,180,943

AIR CONDITIONING SYSTEM FOR AUTOMOBILES

Ralph F. Peo, Buffalo, N. Y., assignor to Houde Engineering Corporation, Buffalo, N. Y., a corporation of New York Application November 13, 1935, Serial No. 49,502

9 Claims. (Cl. 62—117)

This invention relates to the air conditioning of passenger compartments or storage spaces of self-propelled vehicles.

More specifically, this invention relates to mechanism adapted to be readily attached to an automotive vehicle of standard make for conditioning the air in the occupied area or storage space of such vehicles.

In the air conditioning of self-propelled vehicles, it is desirable to provide a mechanical air conditioning system driven by the motor of such a vehicle and adapted to be readily mounted on the vehicle without redesigning or appreciably changing the standard equipment of the vehicle. It is furthermore essential that the air conditioning system be constructed of compact elements which can be operated with the least possible drain of power from the motor of the vehicle.

I have now provided air conditioning systems for automotive vehicles which are actuated by a negligible amount of power taken from the internal combustion engine of such a vehicle. In the air conditioning systems of my invention, I prefer to use a non-inflammable, non-explosive and non-corrosive refrigerant which is liquid at room temperatures and atmospheric pressures, but which is readily vaporized at pressures below atmospheric pressures.

An example of a very successful type of refrigerant in my refrigerant systems is methylene chloride ($CH_2Cl_2$) which is available in commercial quantities under the name of "Carrene".

In the air conditioning systems of this invention, a liquid refrigerant, such as Carrene, is introduced into the system into a receiver tank. The receiver communicates with an expansion valve which, in turn, communicates with an evaporator or cooling coils. Liquid refrigerant from the receiver is expanded through the expansion valve into the low side of the system where it is drawn through the evaporator in an expanded condition and exhausted into vacuum line maintained under reduced pressure by a vacuum pump. The vacuum pump compresses the refrigerant from the vacuum line and flows the same through a condenser which cools the compressed refrigerant and condenses it back to liquid form. The condensed refrigerant is then recirculated back to the receiver. The expanding of the condensed refrigerant in the cooling coils or evaporator lowers the temperature of these coils, and air is propelled around the coils and circulated throughout the occupied area or storage space of the automotive vehicle for lowering the temperature of the vehicle. The vehicle may be completely closed, as by closing all of the doors and windows of a sedan or coupe type of automobile, and the systems of this invention can rapidly lower the temperature of the air in the closed space. Sufficient fresh air for the occupants of the space is supplied by infiltration of outside air through the cracks and crevices of the vehicle.

It is therefore an object of this invention to provide air conditioning systems for standard makes of automotive vehicles to cool the occupied area or storage space of said vehicles.

A further object of this invention is to provide an air conditioning system for automotive vehicles that can be readily mounted on the motor of said vehicles without redesigning any of the standard equipment thereof.

A further object of this invention is to provide an air conditioning system for automotive vehicles which is driven by a minimum amount of power supplied from the motor propelling said vehicle and controlled by easily accessible devices mounted in the occupied area of the vehicle.

A specific object of this invention is to provide an air conditioning system for closed type automotive vehicles which is driven by the motor propelling said vehicle and controlled from the dashboard of said vehicle.

A further specific object is to provide an air temperature modifier in the rear of an automotive vehicle receiving air from the interior of the vehicle at a low level and discharging the air at a higher level.

Other and further objects of this invention will be apparent from the following detailed description of the annexed sheets of drawings which disclose preferred embodiments of this invention.

On the drawings:

Figure 1 is a side elevational view of an air conditioning system according to this invention mounted in an automotive vehicle which is shown in diagrammatic form.

Figure 2 is an enlarged fragmentary diagrammatic top view of an air conditioning system similar to that shown in Figure 1.

As shown on the drawings:

In Figures 1 and 2, there is disclosed an air conditioning system, according to this invention, in which the evaporator unit is mounted at the back end of the passenger compartment of an automotive vehicle or in the storage space behind the rear seat of the vehicle. The air to be cooled is taken from the front of the passenger compartment and circulated back to the evaporator unit through a duct. The forward motion of the vehicle aids this backward circulation, since air currents in a forwardly moving vehicle are towards the rear of the vehicle, and some of the rearwardly moving currents are directed through the duct.

In Figure 1, the reference numeral 10a designates generally an automotive vehicle. The vehicle 10a has a motor compartment 11a, a passenger compartment 12a, and a partition wall 13a separating the motor compartment from the passenger compartment. The automotive vehicle 10a is of the usual sedan type having front and rear seats 14a and 15a, respectively.

The motor compartment 11a contains the motor 16a for propelling the vehicle. A water cooling radiator 17a for the cooling system of the motor is mounted in front of the motor 16a. The end of the crankshaft 18a of the motor 16a, as usual, receives a pulley 19 thereon which propels the fan belt 20a for rotating the fan 21a of the motor. The usual grille or radiator cover 22a is disposed in spaced relation in front of the radiator 17a.

According to this invention, a governor clutch mechanism 70, such as is fully described and claimed in my Patent No. 2,107,341, issued February 8, 1938, filed May 31, 1935, is directly driven from the fan belt 20a by a pulley 71, as shown in Figure 1, or through a jack shaft 72 driven by the fan belt 20a and rotatably mounted in a housing 73 on top of the motor 16a, as shown in Figure 2. The jack shaft 72 has a pulley 75 secured near the back end thereof for driving a belt 76 which rotates the pulley 71 of the governor clutch 70. A second pulley 77 is also mounted on the jack shaft 72 for driving a belt 78 to rotate the rotor of the usual generator 79 for the automobile motor 16a.

The driven member of the governor clutch 70 drives the rotor of a rotary compressor 80 which is mounted on the housing of the governor clutch, as shown. The driven member of the governor clutch 70 may be manually disengaged through a Bowden wire control 81 which extends through the dashboard 82 of the vehicle 10a and has a control knob 83 secured thereon. In this manner, the operator of the vehicle can disengage the clutch 70 when it is not desired to use the refrigerating system. The compressor 80 compresses the spent refrigerant supplied thereto through the vacuum line 84 and forces this compressed refrigerant through a tube 85 into a condenser 86 mounted between the grille 22a and the radiator 17a of the vehicle.

The refrigerant, in flowing through the condenser 86, is cooled by air circulating therethrough around the coils thereof and is condensed to a liquefied form. The liquefied refrigerant flows through a tube 87 to the back end of the vehicle, as shown in Figure 1, where it is introduced into a receiver 88 for collection. The liquefied refrigerant from the receiver is flowed from a tube 89 through a dehydrator 90 which is packed with any suitable dehydrating substance, such as aluminum oxide, to absorb moisture from the refrigerant.

From the dehydrator 90, the liquid refrigerant flows through a tube 91 into an evaporator unit 92 mounted behind the rear seat 15a, as shown in Figure 1.

As shown in Figure 2, the evaporator unit 92 has an expansion valve 93 therein for receiving the refrigerant from the tube 91. The expansion valve permits the expansion of condensed refrigerant into the low side of the system through the cooling coils 94, wherein the refrigerant is gasified and performs its cooling operation. The spent gasified refrigerant is then removed from the cooling coils 94 through the vacuum line 84 into the low side of the compressor 80, where it is again compressed and recirculated through the condenser 86.

As shown in Figure 1, the floor 95 of the vehicle 10a has an opening 96 therethrough in front of the front seat 14a. This opening communicates with a relatively large pipe or duct 97 extending below the floor of the vehicle back to the evaporator unit 92. The opening 96 in the floor 95 may be covered with a grille or screen 98, as shown in Figure 2.

Air is sucked through the duct 97 and through the evaporator unit 92 by means of a blower 99 communicating with the evaporator unit 92 through a pipe or duct 100. The blower 99 discharges the cooled air from the pipe or duct 100 into an upstanding duct 101 and through a horizontally disposed duct 102 having the ends 103 thereof closed, as shown in Figure 2, but being provided with annular openings 104 intermediate the ends thereof for discharging the cooled air laterally into the compartment 12a of the vehicle.

The blower 99 is driven by a small motor 105 which is energized through wires 106 and 107 communicating respectively with the battery 108 of the automotive vehicle and a switch 109 mounted on the dashboard 82 of the vehicle.

From the above description, it should be understood that the flow of the refrigerant in the system is actuated by power supplied from the motor 16a of the vehicle, while the circulation of air in the interior of the vehicle is controlled by a blower energized from current supplied by the battery of the vehicle. The entire system is manually operated by two simple controls conveniently located on the dashboard of the vehicle. When it is desired to use the refrigerating system, the operator of the vehicle merely actuates the knob 83 controlling the Bowden wire 81 to engage the governor clutch 70. This permits the motor 16a to drive the compressor 80 below a predetermined maximum speed. The operator then throws the switch 109 to energize the motor 105 for circulating air from the front of the vehicle through the evaporator unit to be discharged at the rear of the space 12a in a cooled state.

The location of the evaporator unit, blower and the like devices behind the rear seat of the vehicle does not interfere with the occupied area of the vehicle. The cooled air is conveniently discharged upwardly from behind the rear seat along the curved roof of the vehicle 10a, as shown in dotted lines in Figure 1. The cooled air, being heavier than the warm air, will circulate down into the occupied area of the space 12a and will further be circulated back to the inlet opening 96 of the return duct 97.

In the air conditioning systems of this invention, the air in the passenger space of an automotive vehicle is cooled at the rear end of the vehicle, is circulated throughout the passenger space of the vehicle, and is recirculated back to the rear end. The vehicle can be rapidly cooled with all of the windows and doors closed, and sufficient fresh air is always supplied through infiltration of air through cracks and crevices of the doors and windows of the vehicle.

It will, of course, be understood that numerous details of construction may be varied through a wide range without departing from the principles of this invention, and it is therefore not the purpose to limit the patent granted hereon otherwise than is necessitated by the scope of the appended claims.

I claim as my invention:

1. In an automobile having a passenger space with front and rear seats therein, an air conditioning system for cooling said space comprising an evaporator mounted in said space behind the rear seat therein, an air duct extending beneath said space for conveying air to the evaporator, said air duct having an inlet opening in said space in front of the front seat therein, a duct for receiving cooled air from said evaporator extending upwardly therefrom above the rear seat of the automobile, and a blower for propelling air through said upwardly extending duct into the passenger space whereby the forward movement of the automobile effects a rearward circulation of air through the duct having the inlet opening in front of the front seat.

2. In an automobile having a passenger space with a seat therein, an air conditioning system for cooling said space comprising an evaporator mounted in said space behind said seat, an air duct for conveying air from the part of said space adjacent the bottom thereof in front of said seat to said evaporator, a duct for receiving cooled air from said evaporator extending upwardly therefrom above said seat of the automobile, and a blower for propelling air from said upwardly extending duct into the passenger space whereby the cooled air is discharged at a high level in said space.

3. In an automotive vehicle having a passenger space with front and rear seats therein, a heat exchanger mounted behind said rear seat, an air duct extending to said heat exchanger and having an inlet in said space in front of the front seat, and means acting to circulate air from the duct through said heat exchanger and into the passenger space above the rear seat.

4. In an automotive vehicle having a passenger space with front and rear seats therein, a heat exchanger in said space behind said rear seat, a casing for said heat exchanger, an air duct communicating with said casing to supply air to the heat exchanger, said duct having an inlet communicating with the front end portion of said space, an outlet duct extending upwardly from said casing behind said rear seat, and means acting to circulate air upwardly through the outlet duct toward the roof of the vehicle for deflection into the occupied area of the vehicle.

5. In an automobile having a motor compartment and a separate passenger space with front and rear seats therein, an air conditioning system for cooling said space comprising a compressor in said motor compartment adapted to be driven by the automobile motor, a condenser adapted to receive refrigerant from the compressor, a receiver adapted to receive condensed refrigerant from the condenser, an evaporator mounted behind said rear seat, an air duct extending to said evaporator and having an inlet communicating with said space at a point in front of the front seat, means for supplying refrigerant from said receiver to said evaporator, and means propelling air from said air duct around said evaporator and upward toward the top of said space for deflection into the occupied area of the space and for recirculation back to the air duct.

6. The combination with an automobile having a passenger compartment enclosing a front and rear seat and having a roof with a rear portion thereof curving downwardly over the rear seat; of a casing positioned between said rear seat and the rear of said compartment; an air temperature modifier located in said casing; said casing having an air inlet arranged to receive air from the bottom portion of said compartment and an air outlet arranged to direct air toward the upper part of the rear of said compartment and at an angle against the inner surface of the rear portion of said roof; and a fan arranged in said casing to draw air through said modifier; said casing and fan being adapted to cooperate with said roof to direct a circulation of air into said compartment and across the top of said rear seat.

7. The combination with an automobile having a passenger compartment enclosing a front and rear seat and having a roof with a rear portion thereof curving downwardly over the rear seat; of a casing positioned between said rear seat and the rear of said compartment; an evaporator located in said casing, a compressor and condenser located in the engine compartment of said automobile for supplying liquid refrigerant to said evaporator; said casing having an air inlet arranged to receive air from the bottom portion of said compartment and an air outlet arranged to direct air toward the upper part of the rear of said compartment and at an angle against the inner surface of the rear portion of said roof; and a fan arranged in said casing to draw air through said evaporator; said casing and fan being adapted to cooperate with said roof to direct a circulation of air into said compartment and across the top of said rear seat.

8. The combination with an automobile having an enclosing body with a seat therein near the rear thereof, the upper portion of said body extending downwardly over the back of said seat and spaced therefrom; of a casing positioned between the back of said seat and the rear end of said body; an air temperature modifier located in said casing; said casing having an air inlet arranged to receive air from the bottom portion of the interior of said body and an air outlet arranged to direct air toward the upper part of the rear of the interior of said body against the inner surface thereof; and a fan arranged in said casing to draw air through said modifier; said casing and said fan being adapted to cooperate with said inner surface to direct the circulation of air into the interior of said body across the top of said seat.

9. The combination with an automotive vehicle having an enclosing body with a seat therein, the upper rear portion of said body extending downwardly behind said seat in spaced relation from the seat, of a casing mounted on said vehicle behind said seat, an air temperature modifier in said casing, said casing having an air inlet communicating with the interior of the body and arranged to receive air from the lower portion of said interior in front of said seat, said casing also having an air outlet duct extending between the seat and the downwardly extending upper rear portion of the body and communicating with said interior of the body to discharge air into said interior at a higher level than that at which the inlet receives air from the interior, and means to circulate air through the inlet around the temperature modifier and out of the outlet duct.

RALPH F. PEO.